(12) United States Patent
Bedard (10) Patent No.: US 7,980,629 B2
(45) Date of Patent: Jul. 19, 2011

(54) STRADDLE-TYPE SEAT

(76) Inventor: Yvon Bedard, Orford (CA)

( * ) Notice: Subject to any disclaimer, the term of this patent is extended or adjusted under 35 U.S.C. 154(b) by 343 days.

(21) Appl. No.: 12/370,156

(22) Filed: Feb. 12, 2009

(65) Prior Publication Data

US 2009/0206626 A1    Aug. 20, 2009

Related U.S. Application Data

(60) Provisional application No. 61/029,608, filed on Feb. 19, 2008.

(51) Int. Cl.
*B62J 1/08* (2006.01)
(52) U.S. Cl. .................................. 297/195.12; 297/243
(58) Field of Classification Search .............. 297/195.12, 297/214, 218.3, 219.11, 228.13, 243, 248, 297/440.22; 280/288.4; 248/221.11, 222.12; 403/329
See application file for complete search history.

(56) References Cited

U.S. PATENT DOCUMENTS

| 4,860,524 | A | * | 8/1989 | Dumoulin et al. | 54/44.7 |
| 5,191,752 | A | * | 3/1993 | Murphy | 54/44.5 |
| 5,658,050 | A | * | 8/1997 | Lorbiecki | 297/452.41 |
| 6,691,815 | B2 | * | 2/2004 | Rioux et al. | 180/292 |
| 7,743,589 | B2 | * | 6/2010 | Dominique et al. | 54/44.1 |
| 7,837,260 | B2 | * | 11/2010 | Hein et al. | 297/195.12 |
| 2006/0290179 | A1 | * | 12/2006 | Reinhard | 297/215.11 |
| 2007/0018488 | A1 | * | 1/2007 | Hein et al. | 297/195.12 |
| 2007/0120412 | A1 | * | 5/2007 | Koyano et al. | 297/452.26 |

* cited by examiner

*Primary Examiner* — Lori L Lyjak (57) ABSTRACT

A recreational vehicle such as a snowmobile, personal watercraft, or all-terrain vehicle has a removable straddle-type seat that includes a base having a flexible portion that includes an aperture. The base is used in conjunction with a fuel tank or vehicle frame having a protrusion protruding therefrom. The flexible portion is flexed to allow the aperture therein to pass over the protrusion on the fuel tank or vehicle frame such that removal of the seat is quick, easy and requires no tools.

20 Claims, 6 Drawing Sheets

STRADDLE-TYPE SEAT

The present Utility Patent Application claims priority on U.S. Provisional Application 61/029,608 filed Feb. 19, 2008, titled "Straddle-Type Seat".

FIELD OF THE INVENTION

The present invention relates to straddle-type seats for vehicles.

BACKGROUND OF THE INVENTION

Recreational vehicles such as snowmobiles, motorcycles, personal watercraft (PWCs), boats, and all terrain vehicles (ATVs) often have straddle-type seats. The performance of such vehicles often depends, in part, on minimizing their weight. To decrease the weight of these recreational vehicles, designers have developed straddle-type seats that comprise a base frame, a lightweight compressible foam such as polyurethane supported by the base frame, and a fabric cover made of a water-proof material such as nylon, vinyl, or leather that covers the foam to discourage the foam from soaking up water. The size and shape of such seats have been somewhat dictated on how they are attached to the vehicle. Conventional seats have been attached to several vehicle components to ensure they are not inadvertently released.

Snowmobiles, motorcycles, PWCs, boats, and ATVs are operated in areas that present various environmental conditions involving water, snow, dirt, dust and other fine particulate debris. Normal operation of such straddle-seat vehicles kicks up such material, causing the material to deposit on the straddle-seat and overtime become absorbed by the seat causing the seat to become heavy. Because conventional straddle-type seats are fixed to the vehicle with fasteners, considerable effort and time is needed to remove them.

Because the riders of these vehicles prefer a light, dry seat (or at least a seat that can be as dry as possible), there is an interest to developed and design a seat that is light weight and removes quickly from the vehicle. Such a seat, however, is not known in the prior art.

SUMMARY OF THE INVENTION

It is an object of the present invention to ameliorate at least some of the inconveniences present in the prior art.

One aspect of embodiments of the present invention provides a light-weight straddle-type seat for a snowmobile which is attached solely to the snowmobiles fuel tank.

It is also an object of the present invention to provide a straddle-type seat having a compressible foam for seating an occupant thereon, a base disposed below the compressible foam for attaching the compressible foam to a vehicle, the base comprising at least one aperture passing therethrough and at least one lever flexibly attached to the base at a first end thereof, the at least one aperture being at least partially formed within the lever such that when a second end of the lever is lifted, the lever flexes between the first and second ends and at least a portion of the aperture moves with the lever, and a waterproof cover covering the compressible foam and attached to the base to hold the compressible foam and base as a single unit.

Yet another aspect of the invention is wherein the base is a thin-walled molded plastic structure.

Another aspect of the present invention is that the base is molded to fit congruously to a fuel tank.

It is also an object of the present invention that at least one aperture comprise a plurality of apertures.

Yet another aspect of the present invention provides a snowmobile with a frame; a steering system supported by the frame for steering the vehicle; an engine supported by the frame; a propulsion system operatively connected to the engine and supported by the frame; a fuel tank supported by the frame, the fuel tank comprising, at least one protrusion protruding from an upper surface of the fuel tank; and a straddle seat disposed on the fuel tank, the straddle seat comprising, a compressible foam for seating an occupant thereon; a base disposed below the compressible foam for attaching the straddle seat to the fuel tank, the base having at least one aperture passing therethrough to accept the at least one protrusion when assembled to the fuel tank, and a waterproof cover covering the compressible foam and attached to the base to hold the foam and base as a single unit.

Still another aspect of the present invention is that the at least one protrusion has a slot formed therein to accept a portion of the base.

Yet another aspect of the present invention is the base further comprises at least one lever portion flexibly attached to the rigid base at one end thereof, the at least one aperture being at least partially formed within the lever portion such that when the lever portion is flexed, a portion of the aperture moves relative to the protrusion.

Another aspect of the present invention provides the at least one protrusion with a slot to accept a portion of the seat base when assembled to the fuel tank.

Yet another aspect of the present invention provides a snowmobile with a frame; a steering system supported by the frame for steering the vehicle; an engine supported by the frame; a propulsion system operatively connected to the engine and supported by the frame; a fuel tank supported by the frame; and a straddle seat attached exclusively to the fuel tank.

For purposes of this application, the terms related to spatial orientation such as forwardly, rearwardly, left, and right, are as they would normally be understood by a driver of the vehicle sitting thereon in a normal driving position.

Embodiments of the present invention each have a least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative objects, features, aspects, and advantages of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where.

DETAILED DESCRIPTION OF EMBODIMENTS OF THE INVENTION

The present invention will be described with reference to a snowmobile 10, however it should be understood that it could also be used on any other vehicle having a straddle type seat such as a personal watercraft or an all-terrain vehicle.

Figure 1:
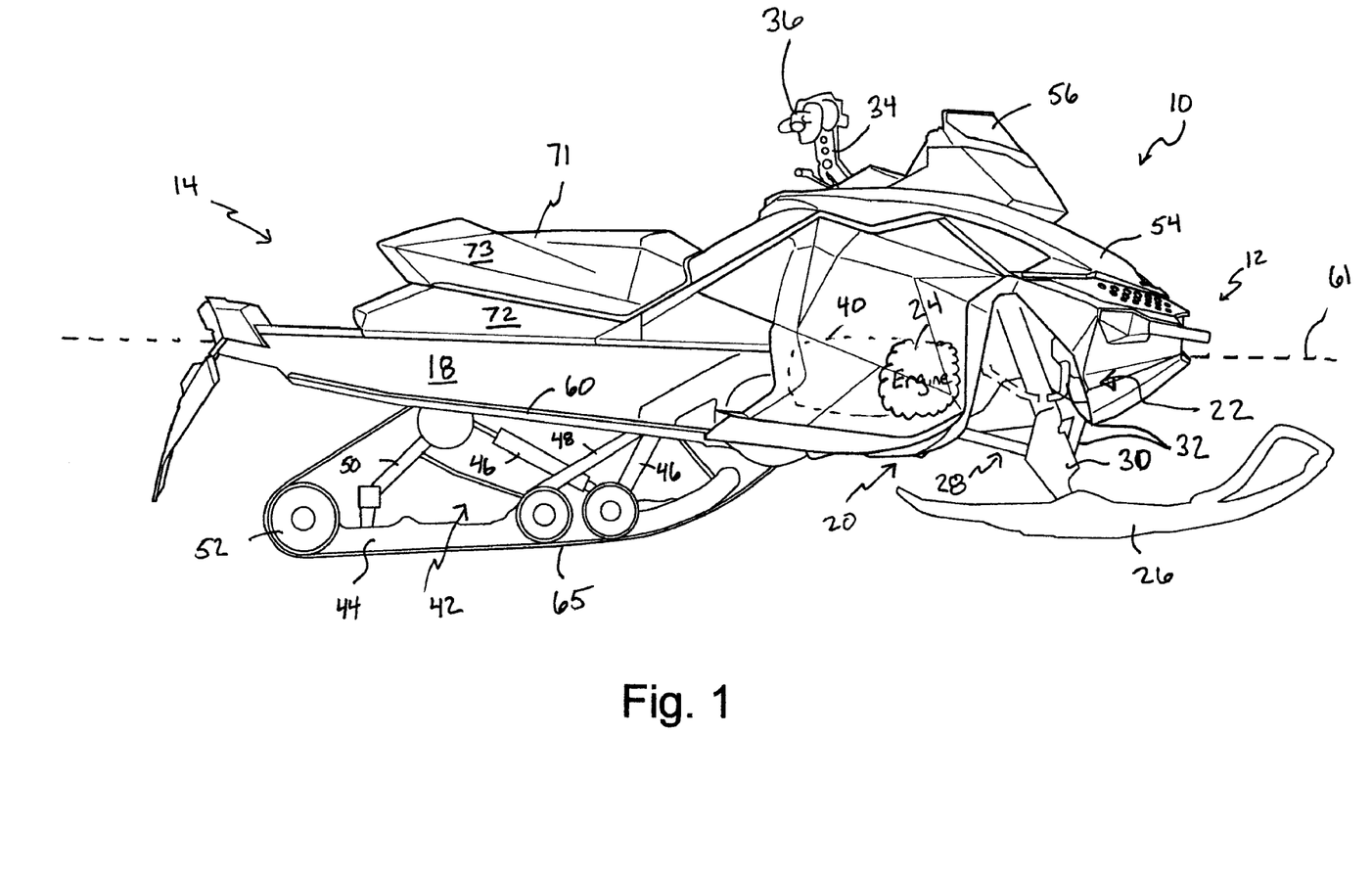
FIG. 1 is a side elevation view of a snowmobile with a seat according to an embodiment of the present invention.

Referring now to FIG. 1, a snowmobile incorporating an embodiment of the present invention is designated generally by reference numeral 10. Although certain aspects of the present invention are applicable in other types of vehicles, the present invention has particular utility in connection with snowmobiles.

The snowmobile 10 includes a forward end 12 and a rearward end 14 which are defined consistently with a travel direction of the vehicle. The snowmobile 10 includes a frame 16 which normally includes a tunnel 18, an engine cradle portion 20 and a front suspension assembly portion 22. Tunnel 18 generally consists of an inverted U-shaped bent sheet metal which extends rearwardly along the longitudinal axis 61 of the snowmobile 10 and is connected at the front to the engine cradle portion 20. Tunnel 18 supports a fuel tank 72 and a seat 71. Seat 71 is removable from the snowmobile 10 to be easily transported if needed. An engine 24, which is schematically illustrated in FIG. 1, is carried by the engine cradle portion 20 of the frame 16. A steering assembly (not indicated) is provided, in which two skis 26 are positioned at the forward end 12 of the snowmobile 10 and are attached to the front suspension assembly portion 22 of the frame 16 through a front suspension assembly 28. The front suspension assembly 28 includes ski legs 30, supporting arms 32 and ball joints (not shown) for operatively connecting the respective skis 26 to a steering column 34. A steering device such as a handlebar 36, positioned forward of a rider and behind the engine 24, is attached to the upper end of the steering column 34 to allow the rider to rotate the ski legs 30 and thus the skis 26, in order to steer the vehicle.

An endless drive track 65 is positioned at the rear end 14 of the snowmobile 10. The drive track 65 is disposed generally under the tunnel 18, and operatively connected to the engine 24 through a belt transmission system 40 illustrated schematically by broken lines and which will be described in greater detail below. The endless drive track 65 is driven to run about a rear suspension assembly 42 for propulsion of the snowmobile 10. The rear suspension assembly 42 includes a pair of slide rails 44 in sliding contact with the endless drive track 65. The rear suspension assembly 42 also includes one or more shock absorbers 46 which may further include a coil spring (not shown) surrounding the individual shock absorbers 46. Suspension arms 48 and 50 are provided to attach the slide rails 44 to the frame 16. One or more idler wheels 52 are also provided in the rear suspension assembly 42.

At the front end 12 of the snowmobile 10, fairings 54 enclose the engine 24 and the belt transmission system 40, thereby providing an external shell that not only protects the engine 24 and the belt transmission system 40, but can also be decorated to make the snowmobile 10 more aesthetically pleasing. Typically, the fairings 54 include a hood (not indicated) and one or more side panels which can be opened to allow access to the engine 24 and the belt transmission system 40 when this is required, for example, for inspection or maintenance of the engine 24 and/or the belt transmission system 40. In the particular snowmobile 10 shown in FIG. 1, the side panels can be opened along a vertical axis to swing away from the snowmobile 10. A windshield 56 may be connected to the fairings 54 near the front end 12 of the snowmobile 10 or directly to the handlebar 36. The windshield 56 acts as a wind screen to lessen the force of the air on the rider while the snowmobile 10 is moving.

The engine 24 is a type of internal combustion engine that is supported on the frame 16 and is located at the engine cradle portion 20. The internal construction of the engine 24 may be of any known type, however the engine 24 drives an output shaft (not shown) that rotates about a horizontally disposed axis that extends generally transversely to a longitudinal centerline 61 of the snowmobile 10. The engine output shaft drives the belt transmission system 40 for transmitting torque to the endless drive track 65 for propulsion of the snowmobile 10.

Figure 2:
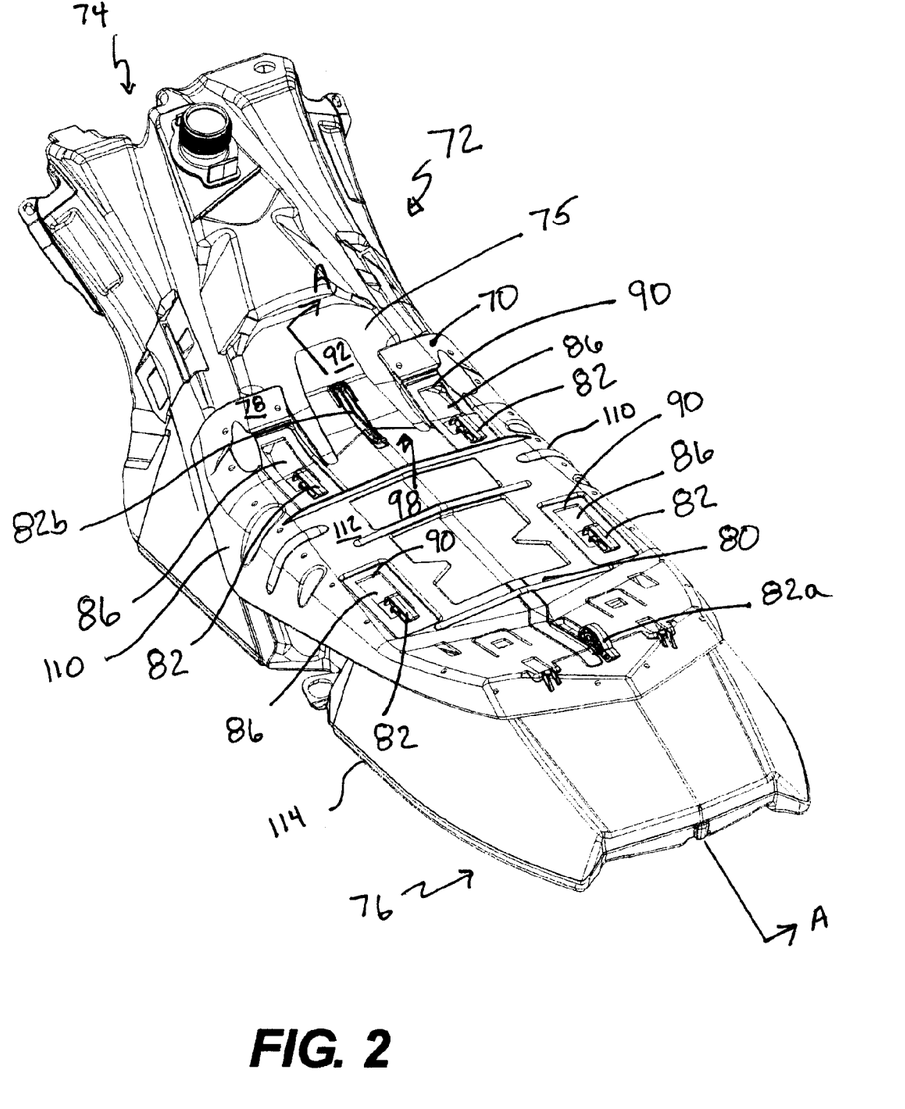
FIG. 2 is a rear isometric view of a seat base and fuel tank combination according to the present invention.

With reference to FIG. 2, a portion of seat 71, seat base 70, and fuel tank 72 are shown. Fuel tank 72 has a front end 74 and a rear end 76. Seat base 70 also has a front end 78 and a rear end 80. Seat base 70 is exclusively attached to the fuel tank 70 and removable therefrom via the interaction between apertures 86 and protrusions or hooks 82. Hooks 82 protrude from a top surface 75 of the tank 72 and are preferably integrally moulded with or otherwise attached to the fuel tank 72. Seat base 70 is preferably of a thin-walled plastic structure shaped to the general contour of the tank 72 such that when the seat base 70 is placed on top of the tank 72 they fit congruously together. The seat base 70 also supports a compressible seat foam 84 (see FIG. 7). A waterproof cover 73 is stretched over the foam 84 and stapled to a lower side of the seat base 70 to hold the seat base 70 and foam 84 together as a single unit as well as to prevent water and moisture from being absorbed by the foam 84. It is contemplated that any open cell or closed cell foam or any combination thereof could be used to make the seat foam 84 of seat 71.

Seat base 70 further includes one or more apertures 86 through which the hooks 82 protrude when the seat base 70 is mounted to the snowmobile 10. Each aperture has a width "W" and length "L" greater than that of the hook 82 protruding therethrough. Preferably, several hooks 82 and apertures 84 are used to prevent the seat base 70 from moving relative to the tank 72. It is contemplated that two hooks could be placed approximately along the longitudinal centerline C of the base 70 and two or more symmetrically placed to the left and right sides of centerline C between the two hooks placed approximately along the centerline. Each aperture 86 aligns with a hook 82 when assembling the seat base 70 to the tank 72 so that the seat base 70 lies congruous with the tank 72.

Figure 3:
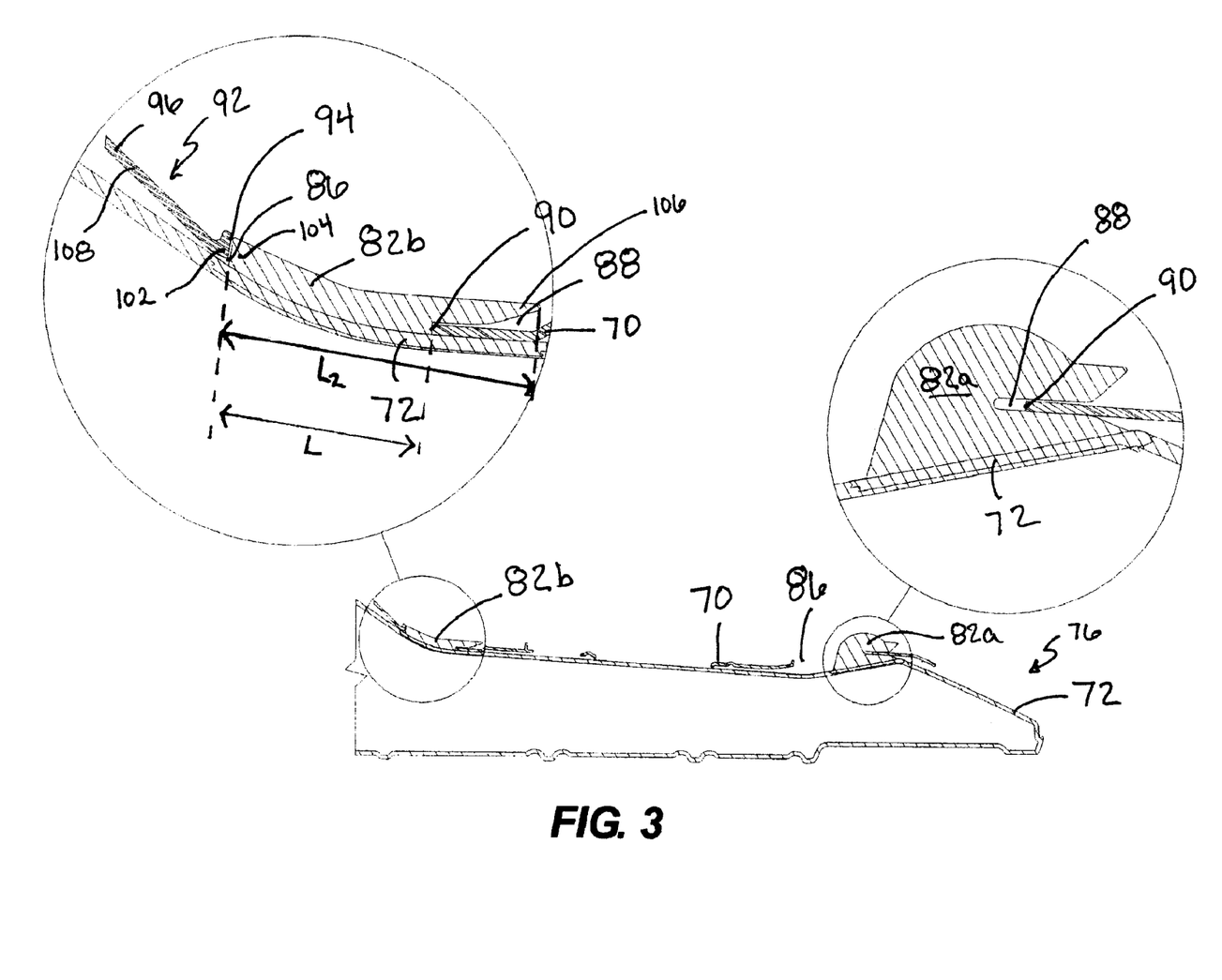
FIG. 3 is a partial cross section of taken across A-A of FIG. 2.

As best seen in FIG. 3, each hook 82 has a slot 88 either formed therein, as with hook 82a at the rear end 76 of the tank 72, or created between the hook 82 and the tank 72 as with hook 82b near the front end 74 of the tank 72. When assembled, slots 88 accept the periphery 90 of the apertures 86 within the seat base 70 to prevent relative movement between the base 70 and tank 72. Slots 88 primarily prevent the vertical movement between the base 70 and the tank 72. Depending on the fit between the slots 88 and the base 70, slots 88 could also help prevent forward and rearward movement therebetween if the slot 88 is slightly smaller than the thickness of the base 70 and tightly receives the periphery of the apertures 86. Slots 88 are facing the rear end 76 of tank 72, but one would recognize the present invention could be practiced by having slots facing toward the front or even to either side of the tank 72.

To install the seat base 70 to the fuel tank 72, the seat base is positioned above tank 72 such that the apertures 86 are aligned with the hooks 82 in order for the hooks 82 to pass through the apertures 86 when the seat is lowered onto the tank 72. The seat base 70 is then pushed forward so the periphery 90 of the apertures 86 enter into the slots 88 within the hooks 82.

Figure 4:
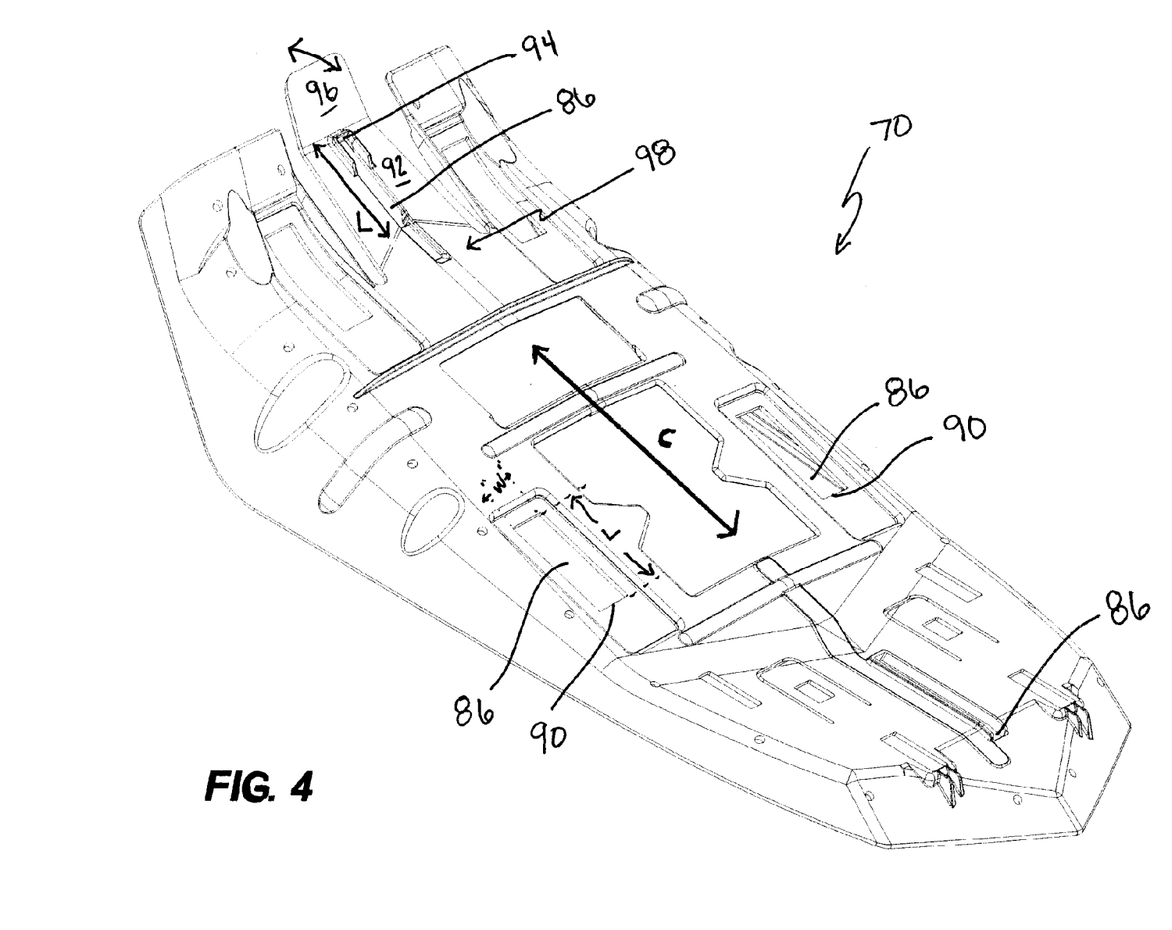
FIG. 4 is a rear isometric view of the seat base.

With reference to FIGS. 3 and 4, to ensure that the seat base 70 does not move rearward with respect to the tank 72 during use of the vehicle, a release lever 92 is formed in the front end 78 of the base 70. Release lever 92 is preferably made by removing portions of the base material to form each side of the lever 92 thereby making the lever 92 flexible with respect to the base 70 about its rear end 98 or between rear end 98 and front end 108. It is also contemplated that lever 92 could be simply attached to the base instead of being integrally formed therewith. Lever 92 also includes the aperture 86 which cooperates with hook 82a described above. The front 94 of the aperture 86 is situated near the front 108 of the lever 92. The front portion 108 of the lever 92 is preferably angled with the rest of the base so that it remains distanced from the tank 72 to provide a tab which can be grasped by the fingers of the user. Upon pulling on tab 96 away from the tank 72, release lever 92 is flexed about its length and elevates the front of the aperture 86 so that it can pass over the hook 82b and allow the seat base 70 to be moved rearward dislodging the base 72 from the slots 88 allowing removal of the seat 70 from the tank 72.

Continuing with FIG. 3, when the seat base 70 is assembled to the tank 72, at least one of the hooks, such as hook 82b will have a length L2, between a front end 104 and a rear end 106, which is equal to or longer than the length L of its corresponding aperture 86. In the case where L2 is greater than L, the hook will have a slot such as slot 88 to allow the hook to pass completely through the aperture thus preventing the seat from being lifted away from the tank and any forward and rearward movement therebetween. Aperture 86 within the lever 92 is substantially completely filled along its length L with the hook 82b so no forward or rearward movement between the base 70 and the tank 72 is permitted unless release lever 92 is lifted such that the front portion 94 of the aperture is raised above the front portion 104 of protrusion 82b. Unlike the remainder of hooks 82 that do not completely fill the apertures 86 when the seat is installed to the tank 72 so as not to prevent rearward movement therebetween. Since hook 82b prevents forward and rearward movement, as well as vertical movement through its slot 88, the remaining hooks 82, if used, are primarily in place to prevent vertical movement of the seat base 70 from the tank 72. While only one release lever is shown, it is contemplated that more release levers can be used in combination with any of the additional apertures 86 and hooks 82. Release lever 92 is situated at the front 78 of the base 70 for convenience, but it could also be situated at the rear 80 of base 70.

Also shown in FIGS. 3 and 4 is lip 94. Lip 94 is a part of the front portion of aperture 84 as well as release lever 92. Lip 94 provides surface area in contact with a front end 104 of protrusion 82b to prevent any rearward movement of seat base 70 with respect to fuel tank 72. Front end 104 is preferably vertical or slightly angled forward such that any rearward force on the seat 71 will pull the lip 94 down toward the tank and not up over the protrusion 82b.

To help prevent lateral movement between the seat 71 and tank 72, the seat base 70 further includes downwardly extending side flanges 110 which preferably follow the contour of the tank. Side flanges 110 extend from a substantially flat horizontal middle section 112 of the seat base 70 which contact the top surface 75 of the tank 70 to a position above the bottom surface 114 of the fuel tank 70 so as to not interfere with other vehicle components when both are installed on a vehicle.

Figure 5:
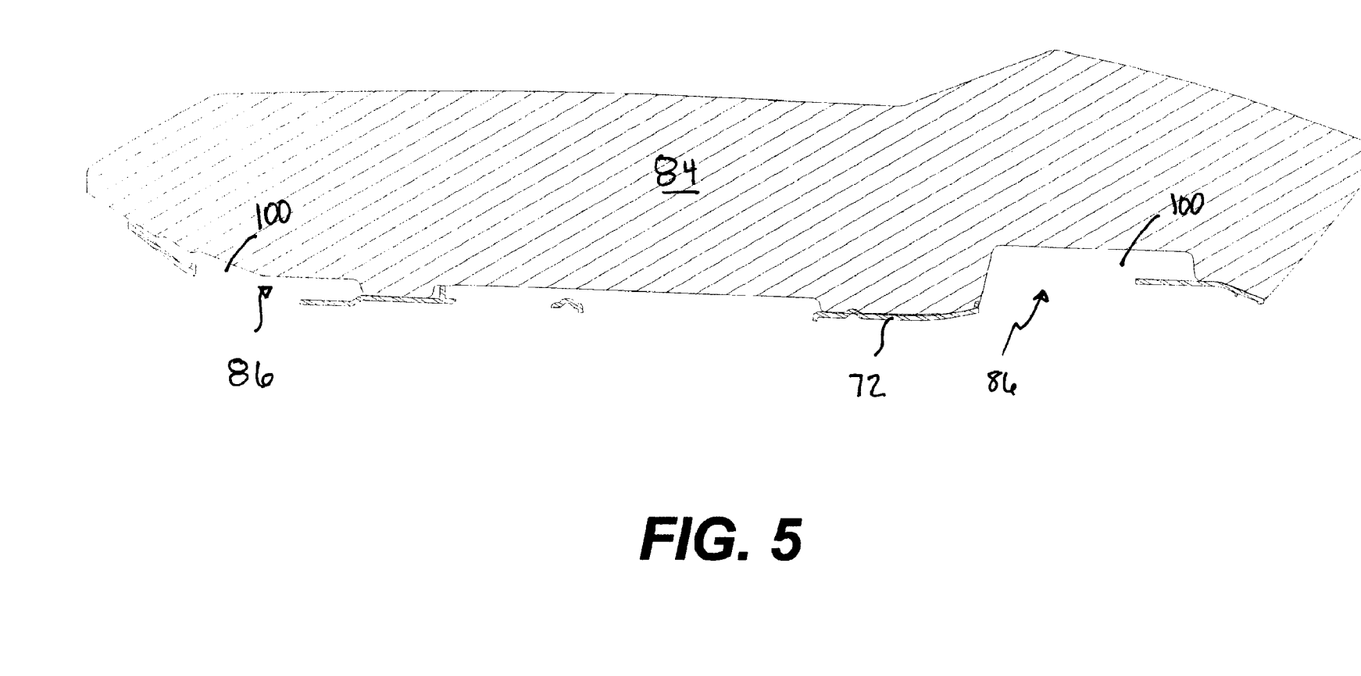
FIG. 5 is a cross section taken along B-B of FIG. 6.
Figure 6:
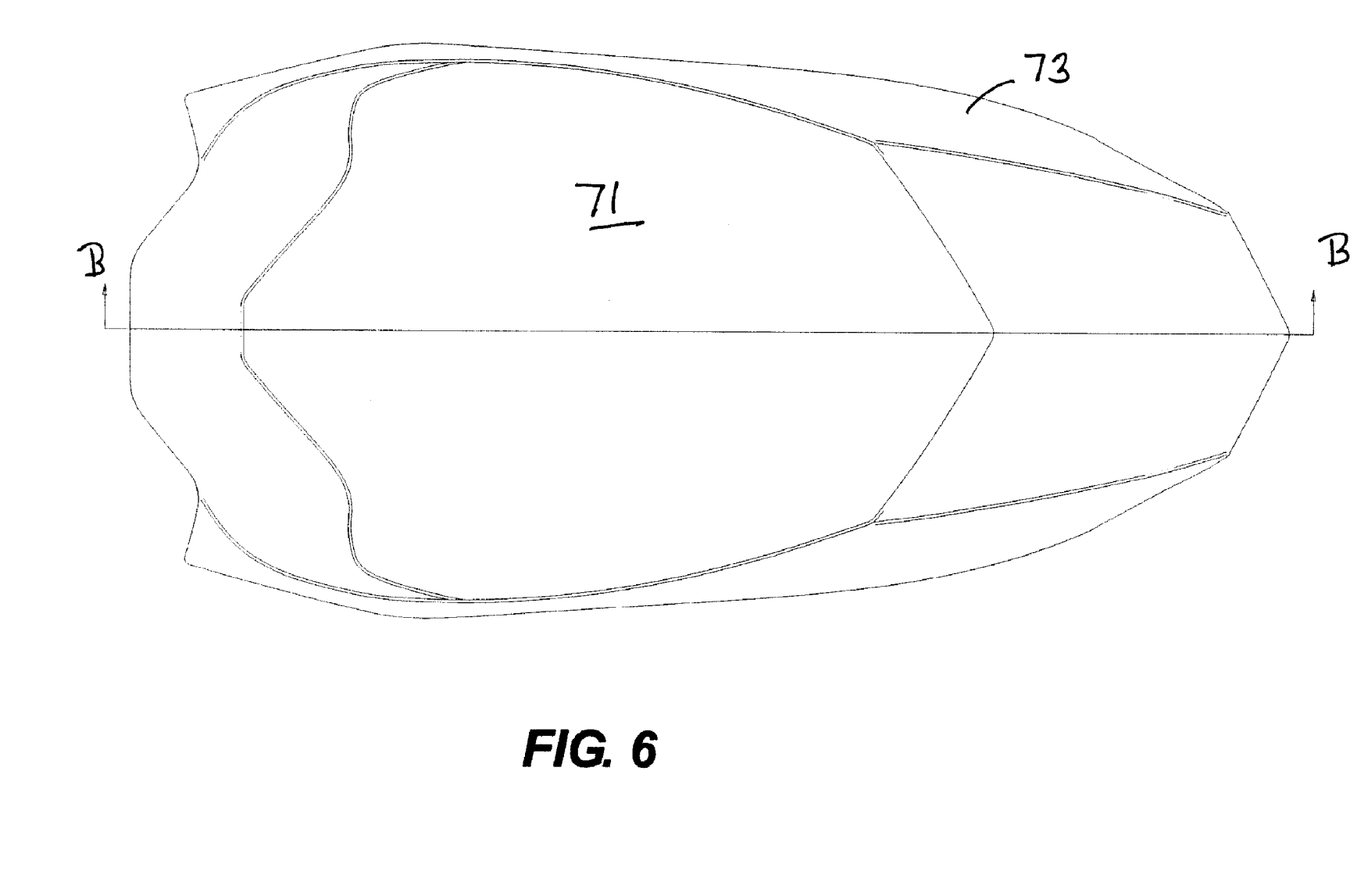
FIG. 6 is a top plan view of the seat and base of the present invention.

Best shown in FIG. 5, foam 84 includes countersunk areas 100 around the apertures 86 to provide clearance for the hooks 82. Countersunk areas 100 allow the hooks 82 to pass though the apertures 86 without interference with foam 84.

Hooks 82 are shown and described in conjunction with a fuel tank 72 because the tank 72 is the portion of the snowmobile 10 located directly below the seat 71 in the embodiment shown. It should be appreciated that hooks 82 could be associated with any part of the vehicle or the vehicle chassis itself. A fuel tank is not necessary to practice the present invention.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A straddle seat for use with a fuel tank, the fuel tank having a forward end, a rearward end, a bottom surface, and a top surface, the top surface including a protrusion extending away from the top surface, the protrusion including a slot opening toward the rearward end of the fuel tank; the seat comprising:
 a compressible foam for seating an occupant thereon;
 a base disposed below and supporting the compressible foam for attaching the straddle seat to the fuel tank, the base having an opening passing therethrough to accept the protrusion, the opening including a periphery to be inserted into the slot of the protrusion to prevent movement of the seat in at least one direction; and
 a cover covering the compressible foam and attached to the base to hold the compressible foam and base as a single unit.

2. The straddle seat of claim 1, further comprising a lever connected to a forward end of the base, the lever at least partially including the opening, the lever being flexible such that at least a portion of the lever can be moved with respect to the fuel tank, without removal of the seat from the fuel tank, to position the opening within the lever to a disengaged position with the protrusion passing therethrough, allowing movement of the seat.

3. The straddle seat of claim 2, wherein the lever has a first position where the opening is engaged with the protrusion preventing movement of the seat toward the rearward end of the fuel tank and a second position where the opening is at least partially disengaged with the protrusion therefore allowing movement of the seat toward the rearward end of the fuel tank.

4. The straddle seat of claim 3, wherein the opening has a front portion and a rear portion, and the at least a portion of the opening in the lever is the front portion of the opening, and the engagement between the front portion of the opening is with a front end of the protrusion, the slot being formed in a rear end of the protrusion.

5. The straddle seat of claim 4, wherein when the seat is installed onto the fuel tank and the lever is in the second position, the slot prevents movement between the fuel tank and the seat in a first direction but allows movement in a second direction, the second direction being toward the rear end of the fuel tank.

6. The straddle seat of claim 5, wherein the compressible foam further comprises at least one cavity justaposed the opening and the protrusion occupies the cavity when the seat is installed onto the fuel tank.

7. The straddle seat of claim 3, wherein the opening has a first length in a longitudinal direction of the base and the protrusion has a second length in the longitudinal direction, the second length being greater than the first length.

8. The straddle seat of claim 7, wherein the base further comprises a second opening and the fuel tank a second protrusion, the second opening having a third length in the longitudinal direction and the second protrusion a fourth length in the longitudinal direction, the third length being greater than the fourth length.

9. The straddle seat of claim 8, wherein the opening and the second opening are along the longitudinal centerline, the base further comprising a third opening to one side of the longitudinal centerline and a fourth opening to the opposite side of the longitudinal centerline.

10. A straddle seat comprising:
a compressible foam for seating an occupant thereon;
a rigid base disposed below the compressible foam for attaching the compressible foam to a vehicle, the base comprising at least one opening passing therethrough and at least one lever flexibly attached to the base at a first end thereof, the at least one opening being at least partially formed within the lever such that when a second end of the lever is lifted, the lever flexes between the first and second ends and at least a portion of the opening moves with the lever; and
a cover covering the compressible foam and attached to the base to hold the compressible foam and base as a single unit.

11. The straddle seat of claim 10, wherein the base is a thin-walled molded plastic structure.

12. The straddle seat of claim 11, wherein the base is molded to fit congruously to a fuel tank.

13. The straddle seat of claim 12, wherein the at least one opening comprises a plurality of openings.

14. The snowmobile of claim 13, wherein the at least one protrusion further comprises a slot to accept a portion of the base when assembled to the fuel tank.

15. A straddle seat for use in combination with a structure of a vehicle, the structure having a forward end, a rearward end, and a top surface, the top surface including:
a first protrusion having a first width and a first length, the first protrusion placed along a longitudinal centerline of the vehicle structure near the forward end of the vehicle structure;
a second protrusion having a second width and a second length, the second protrusion placed along the longitudinal centerline of the vehicle structure near the rearward end of the vehicle structure;
third and fourth protrusions having third and fourth widths and third and fourth lengths respectively, the third and fourth protrusions placed to a first side of the longitudinal centerline of the vehicle structure; and
fifth and sixth protrusions having fifth and sixth widths and fifth and sixth lengths respectively, the fifth and sixth protrusions placed to an opposite side of the longitudinal centerline of the vehicle structure from the third and fourth protrusions, each protrusion extending away from the top surface and including a slot opening toward the rearward end of the vehicle structure;
the seat comprising:
compressible foam for seating an occupant thereon;
a base disposed below and supporting the compressible foam for attaching the straddle seat to the vehicle structure, the base including a substantially flat middle portion with downwardly extending side portions to fit congruously with the vehicle structure, the substantially flat middle structure having,
a first opening to receive the first protrusion, the first opening having a first width and a first length and placed along a longitudinal centerline of the base, the first length of the first opening being smaller than the first length of the first protrusion;
a second opening to receive the second protrusion, the second opening having a second width and a second length and placed along the longitudinal centerline of the base, the second length of the second opening being larger than the second length of the second protrusion;
third and fourth openings to receive the third and fourth protrusions respectively, the third and fourth openings have third and fourth widths and third and fourth lengths respectively and placed to one side of the longitudinal centerline of the base, the third and fourth lengths of the third and fourth openings being larger than the third and fourth lengths of the third and fourth protrusions;
Fifth and sixth openings to receive the fifth and sixth protrusions, the fifth and six openings having fifth and sixth widths and fifth and sixth lengths respectively and placed to an opposite side of the longitudinal centerline of the base from the third and fourth openings, the fifth and sixth lengths of the fifth and sixth openings being larger than the fifth and sixth lengths of the fifth and sixth protrusions; and
a cover covering the compressible foam and attached to the base to hold the compressible foam and base as a single unit.

16. The straddle seat of claim 15, wherein the vehicle structure is a fuel tank and the straddle seat is removable-attached exclusively to the fuel tank with the interaction of the openings with the protrusions.

17. The straddle seat of claim 15, wherein the compressible foam further comprises six cavities of a lower surface thereof, each cavity being adjacent one of the six openings to accept one of the six protrusions.

18. The straddle seat of claim 17, wherein the base further comprises at least one lever flexibly attached to the base at one end thereof, the first opening being at least partially formed within the lever such that when the lever is flexed, a portion of the opening moves with the lever.

19. The straddle seat of claim 15, wherein the first opening further includes a forward end and a rearward end, the first protrusion further includes a forward end a rearward end and a slot is formed in the rearward end thereof,
wherein, to install the straddle seat to the vehicle structure, the rearward end of the first opening is inserted into the slot, such that that the rearward end of the first opening is in front of the rearward end of the protrusion preventing vertical separation between the seat and the vehicle structure and the forward end of the first opening is in front of and in engagement with the forward end of the protrusion preventing longitudinal separation between the seat and the vehicle structure.

20. The straddle seat of claim 19, wherein to remove the straddle seat from the vehicle structure, the lever is flexed in a direction away from the vehicle structure such that the forward end of the first opening is disengaged from the forward end of the first protrusion this allowing longitudinal separation between the seat and the vehicle structure.

* * * * *